United States Patent [19]

Kasugayama et al.

[11] 4,419,677

[45] Dec. 6, 1983

[54] INK JET RECORDING APPARATUS

[75] Inventors: Yukio Kasugayama, Yokohama; Koji Terasawa, Fuchu; Yoshihumi Hattori, Kawasaki, all of Japan

[73] Assignee: Canon Kabushiki Kaisha, Tokyo, Japan

[21] Appl. No.: 444,216

[22] Filed: Nov. 24, 1982

Related U.S. Application Data

[63] Continuation of Ser. No. 195,354, Oct. 9, 1980, abandoned.

[30] Foreign Application Priority Data

Oct. 17, 1979 [JP] Japan ............................... 54-132825

[51] Int. Cl.[3] ............................................ G01D 15/16

[52] U.S. Cl. ................................................ 346/140 R

[58] Field of Search .................................. 346/140, 75

[56] References Cited

U.S. PATENT DOCUMENTS

| | | | |
|---|---|---|---|
| 3,708,798 | 1/1973 | Hildenbrand et al. | 346/140 |
| 3,771,165 | 11/1973 | Kurimoto et al. | 346/140 |
| 3,953,862 | 4/1976 | Amberntsson et al. | 346/140 |
| 4,074,284 | 2/1978 | Dexter et al. | 346/140 |
| 4,170,016 | 10/1979 | Geil | 346/140 |
| 4,272,773 | 6/1981 | Halasz | 346/140 |
| 4,306,245 | 12/1981 | Kasugayama | 346/140 |

*Primary Examiner*—Joseph W. Hartary
*Attorney, Agent, or Firm*—Fitzpatrick, Cella, Harper & Scinto

[57] ABSTRACT

An ink jet recording apparatus has a recording liquid container storing recording liquid therein, a recording head supplied with the recording liquid from the container and a carriage on which the recording head and the recording liquid container are mounted is provided with means for pouring the recording liquid into the recording liquid container.

3 Claims, 7 Drawing Figures

INK JET RECORDING APPARATUS

This is a continuation of application Ser. No. 195,354, filed Oct. 9, 1980, now abandoned.

BACKGROUND OF THE INVENTION

1. Field of the Invention

This invention relates to an ink jet recording apparatus designed such that recording liquid can be poured into a recording liquid container.

2. Description of the Prior Art

In the conventional ink jet recording apparatus using an open system supply mechanism, as shown in FIG. 1 of the accompanying drawings, a supply path 2 is connected to one end of a recording head 1 comprising a piezoelectric element or the like to receive the supply of recording liquid 4 from a recording liquid container 3. The upper surface of the container 3 is formed with a vent hole 5 for maintaining the interior of the container 3 always at atmospheric pressure. The recording liquid 4 in the container 3 always reaches the tip end of the recording head 1 through the supply path 2 and, in response to an electrical signal applied to the piezoelectric element of the recording head 1, liquid drops 6 are discharged from the tip end, namely, the discharge orifice 1A, of the recording head 1, whereby characters or the like are printed on printing paper. The decrease of the recording liquid discharged as liquid drops 6 is successively supplemented from the container 3 through the supply path due to the surface tension of the discharge orifice 1A of the recording head 1 and the difference in level between the recording liquid in the container 3 and the recording head 1 and thus, the recording liquid 4 always reaches the discharge orifice 1A of the recording head 1.

The conventional ink jet recording apparatus of such type suffers from the following problems. That is, where the object into which the ink jet recording apparatus is incorporated is a portable desk top calculator or a small typewriter, if the apparatus body is inclined during the carrying of the calculator or the typewriter, the difference in level of the recording liquid between the container 3 and the discharge orifice 1A sometimes is not maintained at a proper value because there is a certain degree of distance between the container 3 and the tip end of the recording head 1. In such case, the meniscus of the recording liquid formed by the discharge orifice 1A may retreat inwardly of the supply path 2 or the recording liquid may leak from the discharge orifice 1A. When the meniscus has retreated, it is necessary to recover it as by applying a pressure from the container 3 side and, when the recording liquid has leaked, it contaminates the interior of the apparatus. Such recovery of the meniscus during each transportation or the leakage of the recording liquid in the interior of the apparatus is very awkward to the operator and is not desirable.

Also, when vibration or shock is imparted to the apparatus or when the recording head 1 strikes against the printing end portion at high speed, the aforementioned leakage of the recording liquid or the retreat of the meniscus is more liable to occur. That is, when vibration or shock is imparted to the apparatus body or the recording head 1 or the supply path 2, the meniscus at the discharge orifice 1A may be destroyed thereby, so that it may leak as liquid drops to the outside or may retreat inwardly of the supply path 2. At this time, where there is an improper difference in level between the container 3 and the recording head 1, the meniscus is liable to be destroyed and, once it is destroyed, it cannot readily be restored to its original state and the liquid continuously leaks to the outside or the meniscus retreats inwardly of the supply path 2 to a position whereat the balance between the level difference and the surface tension can be kept. Such vibration or shock always occurs where the recording is effected by reciprocating the recording head 1 relative to a recording medium, for example, printing paper, and therefore the presence of an improper level difference between the container 3 and the recording head 1 is fatal. Also, in order that the meniscus may not be destroyed, the speed of reciprocal movement of the recording head 1 is limited and thus, high-speed printing is difficult.

Another problem occurs when bubbles have come into the supply path 2. That is, if bubbles are present only in the supply path 2, the discharging performance will not be hindered, whereas when the bubbles have moved to the recording head 1 with the movement of the recording liquid, the discharge becomes unsatisfactory. Especially, in an apparatus utilizing the deforming action of an electro-mechanical converter member as the discharge drive source of the recording head 1, the energy created by deformation is absorbed into bubbles and such energy is not transmitted to the recording liquid, but the discharge of the recording liquid from the recording head 1 is completely stopped, thus making continuous stable printing difficult.

Applicant has previously proposed an ink jet recording apparatus which intends to overcome the problems in such open system supply mechanism.

FIGS. 2A and 2B of the accompanying drawings show an example of the proposed ink jet recording apparatus. Reference numeral 10 designates a recording head, and the recording head 10 and a recording liquid container 11 are made integral with each other and contained in a single container 12. The container 12 is fixed to a carriage 13 which in turn in slidably mounted on a shaft 14 and effects the printing while moving along the widthwise direction of printing paper. The recording head 10 can comprise a piezoelectric element 15, a nozzle portion 16, a discharge orifice 17 and a supply tube 18. This supply tube 18 extends from the recording head body to the interior of the recording liquid container 11 while assuming an L-shape, so that the recording liquid 19 in the recording liquid container 11 is directed into the recording head 10 through the supply tube 18. Also, this supply tube 18 is fixed to a wall 20 covering the upper portion of the container 12, so that the supply tube 18 is not moved by vibration or shock. Designated by 21 is a vent hole of the recording liquid container 11 for maintaining the pressure in the tank 11 always at atmospheric pressure. Designated by 22 and 23 are connectors for supplying an electrical signal from the outside to the piezoelectric element 15 forming the recording head 10. The piezoelectric element 15 and the connectors 22, 23 are connected by signal lines, not shown. Design is made such that the distance between the discharge orifice 17 provided at the end of the nozzle portion 16 and the distal end 18A of the supply tube 18 is set to a suitable distance.

According to the ink jet recording apparatus constructed as described above, the recording head 10 and the recording liquid container 11 are contained as a unit in the single container 12, and the supply tube 18 for supplying the recording liquid to the recording head 10 is determined to an appropriate length and inserted into the recording liquid container 11 and thus, the recording liquid never leaks from the recording head 10 or the meniscus in the discharge orifice 17 never retreats inwardly of the supply tube 18 due to the inclination, vibration or shock as previously described.

However, it has been found that such an ink jet recording apparatus still suffers from problems.

One of the problems is that in the case of a compact calculator in which high printing speed is required, the reciprocally moved drive carriage portion should desirably be light in weight from the viewpoint of the performance of the drive motor and therefore, the recording liquid stored in the recording liquid container is restricted in weight. Accordingly, in FIG. 2, the volume of the recording liquid container 11 must be minimized to provide a light weight container and realize high-speed printing. However, if the volume of the recording liquid container 11 is reduced, the recording liquid in that container will be exhausted in a short time and thus, the container 12 containing the recording head 10 and the recording liquid container 11 as a unit must be frequently replaced by a new one, but undesirably this means a higher maintenance expense in the case of desk top calculators provided with a printer or typewriters directed to individual users, because the recording head is expensive.

SUMMARY OF THE INVENTION

It is an object of the present invention to provide an inexpensive ink jet recording apparatus.

It is another object of the present invention to provide an ink jet recording apparatus which is capable of high-speed printing.

It is still another object of the present invention to enable recording liquid to be poured into the recording liquid container from outside thereof.

It is yet still another object of the present invention to enable recording liquid to be easily poured into the recording liquid container.

The invention will become fully apparent from the following detailed description thereof taken in conjunction with the accompanying drawings.

DESCRIPTION OF THE PREFERRED EMBODIMENTS

Figure 1:
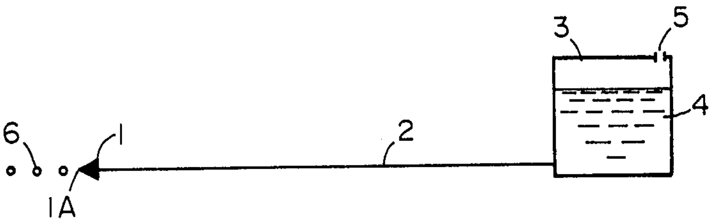
FIG. 1 PRIOR ART
FIG. 1 schematically shows the construction of the ink jet recording apparatus according to the prior art.
Figure 2A:
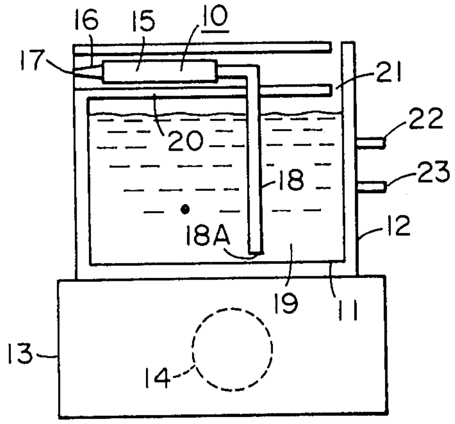
FIG. 2A PRIOR ART
FIGS. 2A and 2B show the construction of an ink jet recording apparatus already proposed.
Figure 2B:
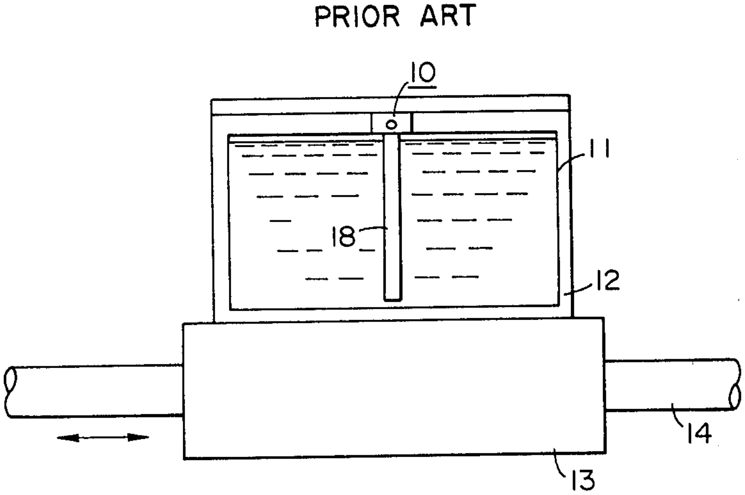
FIG. 2B PRIOR ART
Figure 3:
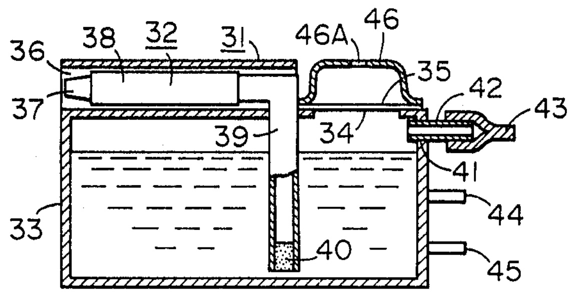
FIG. 3 is a longitudinal cross-sectional view showing an example of the recording liquid container in the ink jet recording apparatus of the present invention.

FIG. 3 shows an example of the recording liquid container in the present invention. Reference numeral 31 designates a head/container portion which comprises a recording head 32 and a recording liquid container 33 formed integrally with each other. The upper wall of the recording liquid container 33 is formed with a vent hole 34 for maintaining the interior of the container 33 always at atmospheric pressure, and a vent filter 35 is mounted thereabove. The vent filter 35 may suitably be a membrane filter or a screen consisting of fiber woven into the form of meshes, and the vent filter 35 sufficiently passes gases therethrough but does not pass liquid therethrough unless a certain degree of pressure is applied. Accordingly, even if the ink jet recording device is turned upside down, the recording liquid in the container will not immediately flow to the outside. On that portion of the upper surface of the recording liquid container 33 on which the vent filter 35 is not mounted, a recording head containing portion 36 of rectangular cross-section is provided to contain the recording head 32. The recording head 32 comprises, for example, a glass nozzle 37 having the peripheral surface thereof secured by a piezoelectric element 38, and a substantially L-shaped supply tube 39 is connected to the rear end (the right end in FIG. 3) of the nozzle 37. This supply tube 39 is inserted into the neighborhood of the bottom of the recording liquid container 33. Further, a member 40 which can be impregnated with the recording liquid may suitably be inserted into the lower end portion of the supply tube 39. Thus, even if the recording liquid in the recording liquid container 33 is exhausted, impossibility of printing will not immediately occur because of the member 40 being impregnated with the recording liquid and in addition, entry of dust into the recording head can be prevented.

A hole 41 is formed in the upper portion of one side wall (the right side wall in FIG. 3) of the recording liquid container 33, and one end of a recording liquid supply tube 42 is inserted into the hole 41 to thereby form a recording liquid supply portion. The fore end of this tube 42 is normally covered with a cap 43 to prevent outflow of the recording liquid from the recording liquid container 33. Designated by 44 and 45 are terminals for supplying an electrical signal to the recording head 32. These terminals are connected to the piezoelectric element 38 by signal lines, not shown. Where the thus constructed head/container portion 31 is mounted on an electronic instrument such as a desk top electronic calculator provided with a printer, a typewriter, a facsimile, a word processor or the like, the aforementioned terminals 44 and 45 are connected to a connector (not shown) provided on the carriage (not shown) of such electronic instrument to supply a drive signal to the recording head. Also, by the connection of these terminals 44 and 45 to the connector, the head-container portion 31 can be fixed to the carriage.

If a diaphragm 46 is provided above the vent filter 35, even when bubbles or foreign materials enter into the recording head 32 to cause unsatisfactory discharge, the pressure within the container 33 can be increased by covering a small hole 46A provided at the center of the diaphragm 46 with a finger and depressing the diaphragm 46, whereby the recording liquid can be forced to discharge from the recording head 32, thus remedying the unsatisfactory discharge.

Figure 4:
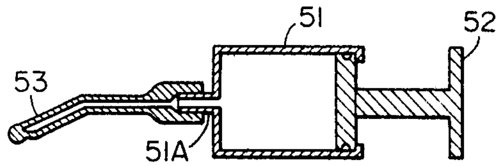
FIG. 4 is a longitudinal cross-sectional view showing an example of the recording liquid supply device for supplying recording liquid to the recording liquid container shown in FIG. 3.

FIG. 4 shows an example of the supply device for supplying the recording liquid to the recording liquid container 33. Reference numeral 51 designates a cylindrical supply device body filled with reserve recording liquid. A piston 52 is fitted to one end of the supply device body 51. The other end of the supply device body is provided with a reduced diameter portion 51A, and a flexible line 53 as a recording liquid discharging portion is mounted to the reduced diameter portion 51A. The fore end of the flexible line 53 is closed as by heating or like means to enclose the recording liquid therein. To supply the recording liquid to the recording liquid container 33, the fore end of the flexible line 53 may be severed and this flexible line 53 may be connected to the recording liquid supply tube 42 of the recording liquid container 33.

Subsequently, the piston 52 may be pushed to supply the recording liquid from within the supply device body 51 into the recording liquid container 33 through the line 53 and the tube 42. If the amount of recording liquid filling the supply device body 51 is made substantially equal to or somewhat smaller than the volume of the recording liquid container 33, there will be no fear that during the supply of the recording liquid, the recording liquid overflows from the recording liquid container 33 to contaminate the environment.

Figure 5:
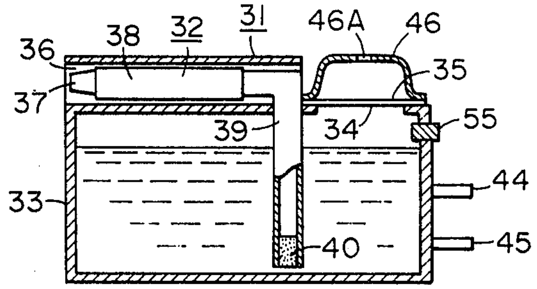
FIG. 5 is a longitudinal cross-sectional view showing another example of the recording liquid container in the ink jet recording apparatus of the present invention.
Figure 6:
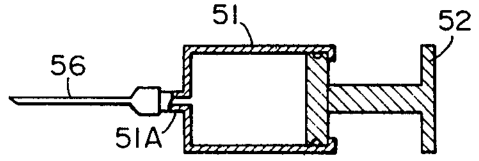
FIG. 6 is a longitudinal cross-sectional view showing an example of the recording liquid supply device for supplying recording liquid to the recording liquid container shown in FIG. 5.

FIG. 5 shows another embodiment of the head/container portion in the present invention, and parts similar to those of FIGS. 3 and 4 are given similar reference characters and need not be described. Designated by 55 is a blind plug comprising an elastic member provided with a so-called navel, and it is attached to one side wall of the recording liquid container 33 to form a recording liquid supply portion. FIG. 6 shows a supply device for supplying the recording liquid to the recording liquid container shown in FIG. 5. A needle 56 as a recording liquid discharging portion is mounted to the reduced diameter portion 51A of the supply device body 51. If this needle 56 is inserted into the navel portion of the blind plug 55 shown in FIG. 5 and the piston 52 is depressed, the recording liquid may be supplied into the recording liquid container 33.

According to the present invention, as has been described above, a recording liquid container of a necessary minimum volume is constructed integrally with the recording head and the recording liquid can be easily supplied or poured into this recording liquid container from outside, so that high speed printing becomes possible. Also, when the recording liquid in the recording liquid container has been decreased, it is not necessary to replace the recording liquid container integral with the expensive recording head by a new one and thus, the maintenance expense of desk top electronic calculators provided with printers directed to individual users can be reduced.

What we claim is:

1. A compact ink jet recording apparatus comprising:

a compact recording liquid container having an elastic plug provided in an aperture formed in a wall of said container, wherein said plug prevents escape of recording liquid from said container;

a recording head integral with said container for effecting printing, while moving longitudinally along printing paper, by discharging recording liquid supplied from said container;

a vent;

a vent filter mounted above the vent, for preventing the passage of the recording liquid while permitting the passage of gases therethrough;

pressurizing means provided above said vent filter, to manually apply pressure to the interior of said recording liquid container through said vent filter; and a recording liquid supply device including:

a cylindrical supply body for storing recording liquid therein;

a piston member fitted to said body for manually changing volume of the recording liquid stored in said body;

and a ink supply member mounted to said body for communicating with the interior of said body.

2. An ink jet recording apparatus according to claim 1, wherein said apparatus comprises carrying means for mounting said recording liquid container and said recording head thereon, said carrying means being movable along the printing paper.

3. A compact ink jet recording apparatus according to claim 1, wherein said plug is provided in a side wall of said container as a mark for indicating a liquid surface level of ink in said container.

* * * * *